(12) United States Patent
Graves et al.

(10) Patent No.: US 10,220,553 B2
(45) Date of Patent: Mar. 5, 2019

(54) METHOD OF MAKING AN ITEM AND ITEM

(71) Applicant: Bose Corporation, Framingham, MA (US)

(72) Inventors: Wayne C. Graves, Royal Oak, MI (US); James R. Smith, Nashua, NH (US); Steve Palumbo, Auburn, MA (US)

(73) Assignee: Bose Corporation, Framingham, MA (US)

( * ) Notice: Subject to any disclaimer, the term of this patent is extended or adjusted under 35 U.S.C. 154(b) by 175 days.

(21) Appl. No.: 15/299,419

(22) Filed: Oct. 20, 2016

(65) Prior Publication Data

US 2018/0111295 A1    Apr. 26, 2018

(51) Int. Cl.
*B29C 45/26* (2006.01)
*B29C 45/72* (2006.01)
*B29C 65/70* (2006.01)
*B29C 65/78* (2006.01)
*B29C 45/00* (2006.01)

(52) U.S. Cl.
CPC ........ *B29C 45/006* (2013.01); *B29C 45/2602* (2013.01); *B29C 45/7207* (2013.01); *B29C 65/70* (2013.01); *B29C 65/78* (2013.01); *B29C 2045/0074* (2013.01); *B29K 2065/00* (2013.01)

(58) Field of Classification Search
CPC .. B29C 2045/0074; B29C 69/70; B29C 65/70
See application file for complete search history.

(56) References Cited

U.S. PATENT DOCUMENTS 4,447,373 A   *   5/1984   Chappell ................... A61F 6/08
                                                                                     156/146
8,652,383 B2     2/2014   Gotsu
(Continued)

FOREIGN PATENT DOCUMENTS

DE     102009037662 A1 *   2/2011   ........... B29C 45/006
DE     202011003608 U1 *   11/2011   ........... B29C 45/006
(Continued)

OTHER PUBLICATIONS

Partial machine translation of JP 63-237918A dated Oct. 1988 obtained from the espace website. (Year: 1988).*
(Continued)

*Primary Examiner* — Robert B Davis
(74) *Attorney, Agent, or Firm* — Bose Corporation

(57) ABSTRACT

A mold is provided. First and second materials are introduced into respective first and second portions of the mold to create a first and second parts of the item. The first and second parts of the item are allowed to solidify. The mold is opened and a heating element is inserted into the mold. A section of each of the first and second parts of the item is heated to above their glass transition temperatures with the heating element. The heating element is removed from the mold. The mold is closed such that the sections of the first and second parts of the item come into contact with each other. The sections of the first and second parts are cooled to below their glass transition temperatures to become joined. The mold is opened such that the item can be removed from the mold.

14 Claims, 8 Drawing Sheets

(56) References Cited

U.S. PATENT DOCUMENTS

2009/0159034 A1* 6/2009 Katayama ........... B29C 47/0019
123/184.21
2016/0221070 A1* 8/2016 Gaudin .................. B22C 9/065

FOREIGN PATENT DOCUMENTS

FR          2902365 A1 * 12/2007  ........... B29C 45/006
JP         63237918 A  * 10/1988  ........... B29C 45/006

OTHER PUBLICATIONS

Partial machine translation of FR2902365A1 dated Dec. 2007 obtained from the espace website. (Year: 2007).*
Partial machine translation of DE102009037662 A1 dated Feb. 2011 obtained from the espace website. (Year: 2011).*

* cited by examiner

METHOD OF MAKING AN ITEM AND ITEM

BACKGROUND

U.S. Pat. No. 8,652,383 discloses an insert part weld molding method for reliably welding an insert part to a blow molded object while preventing an unwelded portion from being created at a circumferential edge of the insert part in a thickness direction thereof. The insert part weld molding method welds a blow molded object to an insert part 3 set in a mold 7, wherein a molding surface 7a of the mold 7 is set higher than a front surface 6d of a portion to be welded of the insert part 3, and an entire surface of a circumferential edge 6b of the insert part 3 in the thickness direction thereof and a parison 11 of the blow molded object are brought into a gapless welded state. Also adopted is a method of suppressing a decrease in temperature of the insert part 3 by arranging a preheating plate 8 which is made of a high thermal conducting material and which is to become a part of the molding surface 7a of the mold 7 in a vicinity of a portion where the parison 11 and the circumferential edge 6b of the insert part 3 in the thickness direction thereof are welded, and arranging a heat insulating plate 9 between the preheating plate 8 and the mold 7.

SUMMARY

In general, in one aspect, a method of creating an item includes providing a mold and introducing a first material into a first portion of the mold to create a first part of the item. A second material is introduced into a second portion of the mold to create a second part of the item. The first and second parts of the item are allowed to solidify. The mold is opened and then a heating element is inserted into the mold. A section of each of the first and second parts of the item is heated to above their glass transition temperatures with the heating element. The heating element is removed from the mold. The mold is closed such that the sections of the first and second parts of the item come into contact with each other. The sections of the first and second parts of the item are cooled to below their glass transition temperatures to become joined. The mold is opened such that the item can be removed from the mold.

Implementations may include one or more of the following, in any combination. The mold has first and second exterior portions and an interior portion. The first part of the item is created between the first exterior mold portion and the interior mold portion. The second part of the item is created between the second exterior mold portion and the interior mold portion. The interior mold portion is removed from being between the first and second exterior portions of the mold to allow the heating element to be inserted. The interior mold portion is removed from being between the first and second exterior portions of the mold prior to closing the mold such that the first and second exterior portions of the mold can move closer together to allow the sections of the first and second parts of the item to come into contact with each other. The interior mold portion is coupled to the heating element. The first and second materials are substantially the same material. The first and second materials are different from each other. The first and second materials are plastic. The materials are introduced into the mold via an injection molding process. The heating step is accomplished by one or more of radiant heating and contact heating.

In general, in another aspect, a method of creating an item includes providing a mold and introducing a first material into a first portion of the mold to create a first part of the item. A second material is introduced into a second portion of the mold to create a second part of the item. The first and second parts of the item are allowed to solidify. The mold is opened and a heating element is inserted into the mold. A section of one or both of the first and second parts of the item are heated to above their glass transition temperatures with the heating element. The heating element is removed from the mold. The mold is closed such that the first and second parts of the item come into contact with each other, including the one or both heated sections. The one or both sections of the first and second parts of the item are cooled below their glass transition temperatures. The mold is opened such that the item can be removed from the mold.

Implementations may include one or more of the above and below features, in any combination. The cooling step is done by flowing a cooling liquid through the mold.

In general, in yet another aspect, a mold includes an interior mold portion having features along a first surface for forming a portion of a first part of an item. The mold further includes features along an opposite, second surface for forming a portion of a second part of the item A heating element is spaced apart from the inner mold portion and coupled thereto.

Implementations may include one or more of the above and below features, in any combination. A first exterior mold portion includes a first cavity that cooperates with the first surface of the interior mold portion to form the first part of the item. A second exterior mold portion includes a second cavity that cooperates with the second surface of the interior mold portion to form the second part of the item. The interior mold portion and the heating element are configured to be displaceable, relative to the first and second exterior mold portions, between at least three position including (i) a first position in which the interior mold portion is disposed directly between the first and second exterior mold portion, (ii) a second position in which the heating element is disposed directly between the first and second exterior mold portions, and (iii) a third position in which neither the interior mold portion nor the heating element is disposed directly between the first and second exterior mold portions.

All examples and features mentioned above can be combined in any technically possible way. Other features and advantages will be apparent from the description and the claims.

DESCRIPTION

The description below relates to a mold in which two parts of an item are created which are separate from each other. The parts are allowed to solidify, the mold is opened, and a portion of the mold is replaced with a heating element. The heating element heats a section of each of the parts, and then the heating element is removed from the mold. The mold is then closed to bring the heated sections of the parts into contact with each other. The sections are then cooled and the mold is opened so that the item can be removed from the mold.

Figure 1:
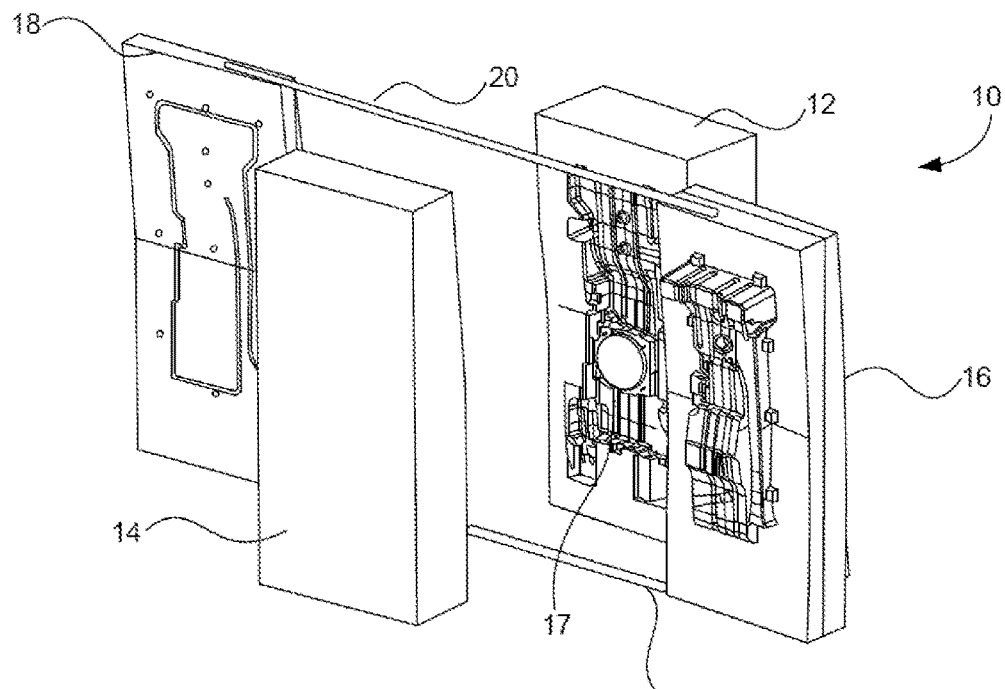
FIG. 1 shows a perspective view of a mold with a heating element.

Referring to FIG. 1, a method of creating an item includes providing a mold 10. In this example, the mold is an injection mold which has two exterior portions 12 and 14, and an interior portion 16. A mold cavity 17 is provided in exterior mold portion 12. Another mold cavity (not visible) is provided in exterior mold portion 14. Other types of molds such as a foam molding mold could alternatively be used. The interior mold portion 16 is offset from the exterior mold portions 12 and 14 at this point in time. A heating element 18 is coupled to the interior mold portion 16 by a pair of rods 20. A programmable logic controller is used to control the process described in this disclosure.

Figure 2:
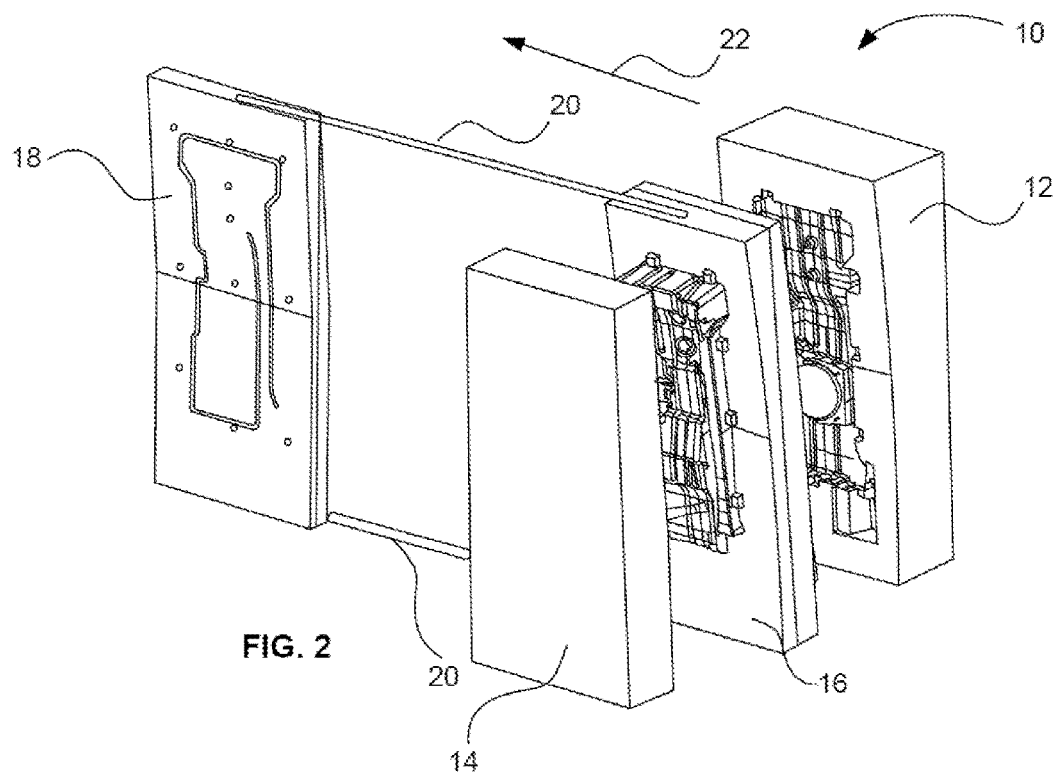
FIG. 2 shows the mold of FIG. 1 with the heating element and an interior mold portion in a different location.

Turning to FIG. 2, the heating element 18 and the interior mold portion 16 are moved in the direction of an arrow 22 by, for example, a robot arm (not shown) that grasps the rods 20. This places the interior mold portion 16 between the exterior mold portions 12 and 14.

Figure 3A:
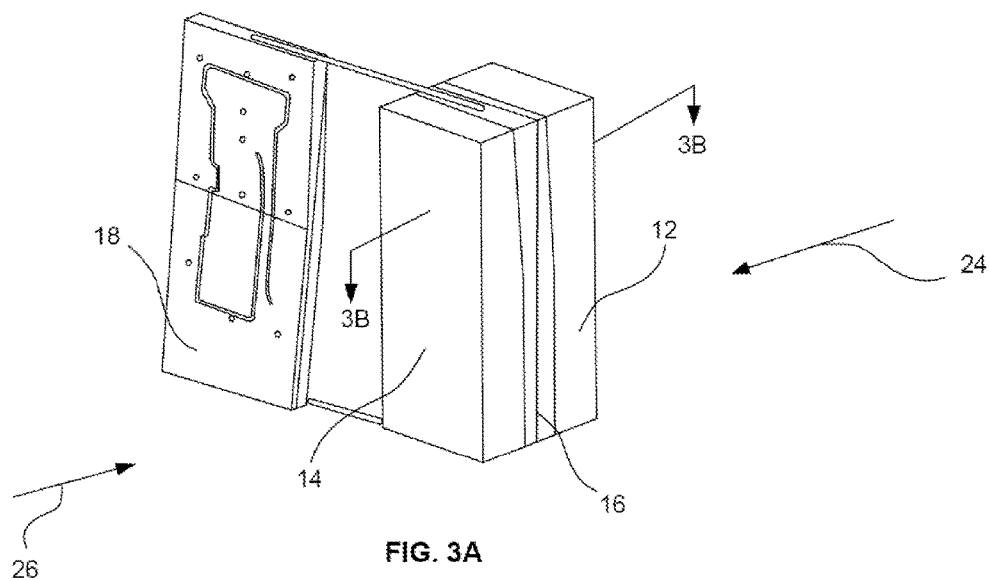
FIG. 3A shows the mold of FIG. 2 with the interior mold portion sandwiched between two exterior mold portions.
Figure 3B:
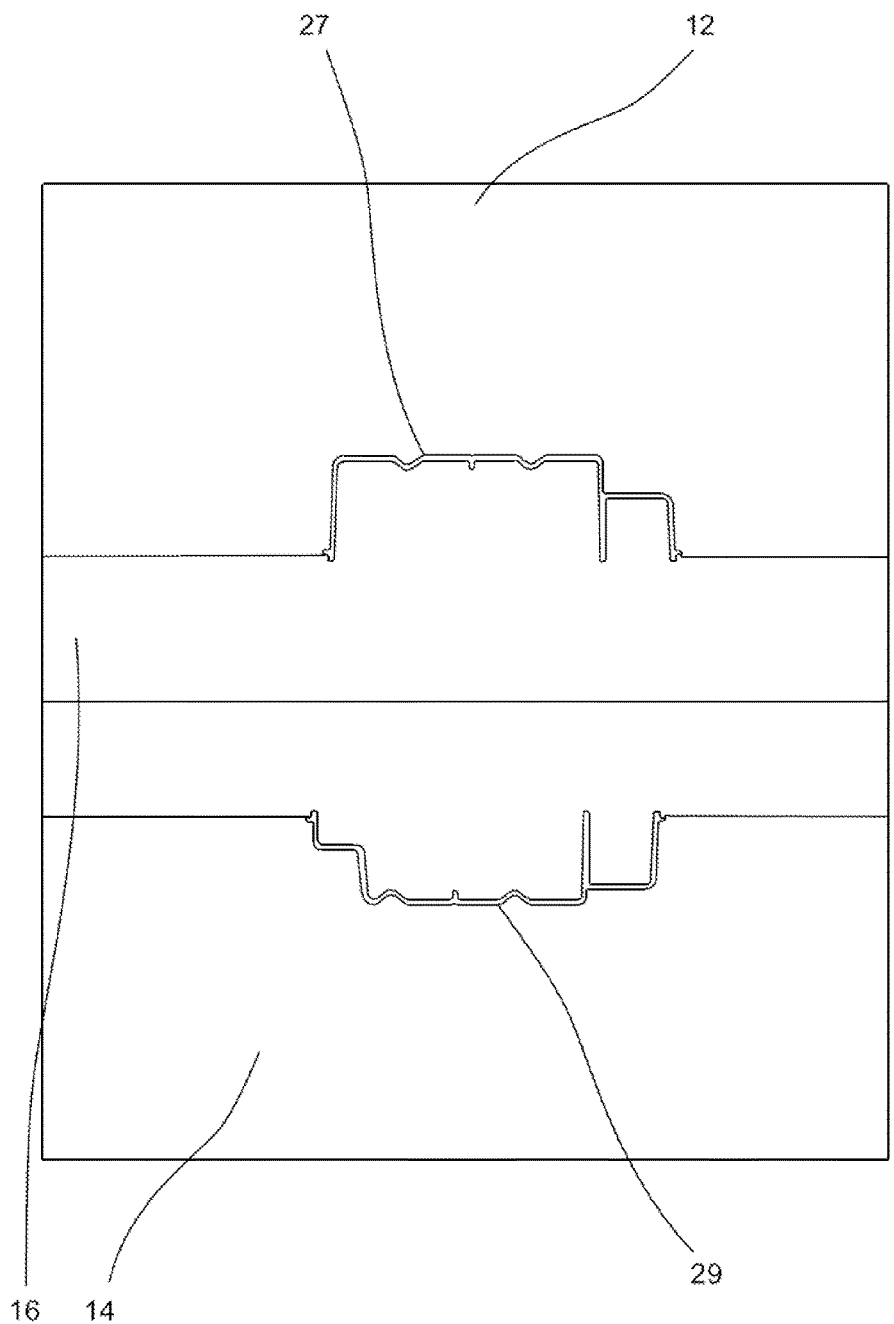
FIG. 3B is a partial sectional view of FIG. 3A taken along lines 3B-3B.

With reference to FIGS. 3A and 3B, the two exterior mold portions 12 and 14 are moved towards each other in the direction of respective arrows 24 and 26 under hydraulic pressure from an injection press (not shown) until they each press against the interior mold portion 16. A first material is then introduced (e.g. injected) into a first portion of the mold including the mold cavity 17 (FIG. 1) to create a first part 27 of the item being created. A second material is introduced (e.g. injected) into a second portion of the mold including the cavity in mold portion 14 to create a second part 29 of the item. As such, the first part 27 of the item is created between the exterior mold portion 12 and the interior mold portion 16, and the second part 29 of the item is created between the second exterior mold portion 14 and the interior mold portion 16.

The first and second materials are preferable substantially the same material (e.g. an injectable thermoplastic), but they could be different from each other as long as they can be welded to each other. The first and/or second material can be a plastic such as a modified polyphenylene ether which includes a blend of polyphenylene oxide and polystyrene. Thermoplastic amorphous resins and thermoplastic crystalline resins can be used. After the first and second materials are fully introduced into the first and second portions of the mold, the first and second parts of the item are allowed to solidify (e.g. by cooling). One or more of the mold portions 12, 14 and 16 preferably has a cool liquid (e.g. water) flowing through an interior of the mold portions to more rapidly cool the parts being created.

Figure 4:
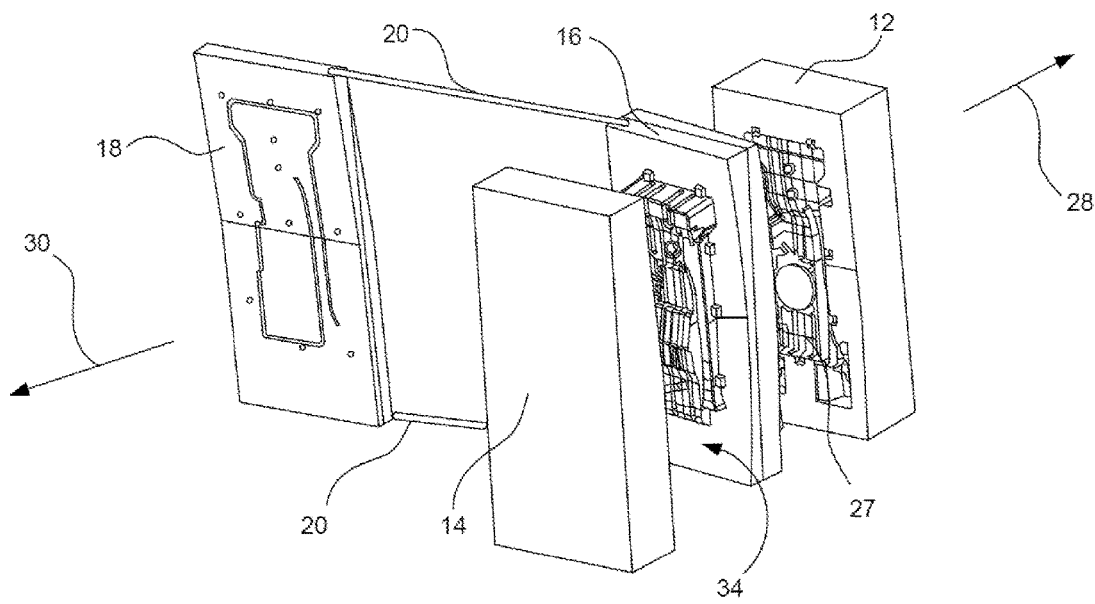
FIG. 4 shows the mold of FIG. 1 back in the position shown in FIG. 2.

Referring to FIG. 4, after the parts have solidified, the mold is opened by moving the mold portions 12 and 14 away from the mold portion 16 in the direction of respective arrows 28 and 30. The part 27 is retained in the cavity 17 (FIG. 1) of the mold portion 12. The part 29 (not visible in FIG. 4) is retained and located in the cavity of the mold portion 14 at location 34.

Figure 5:
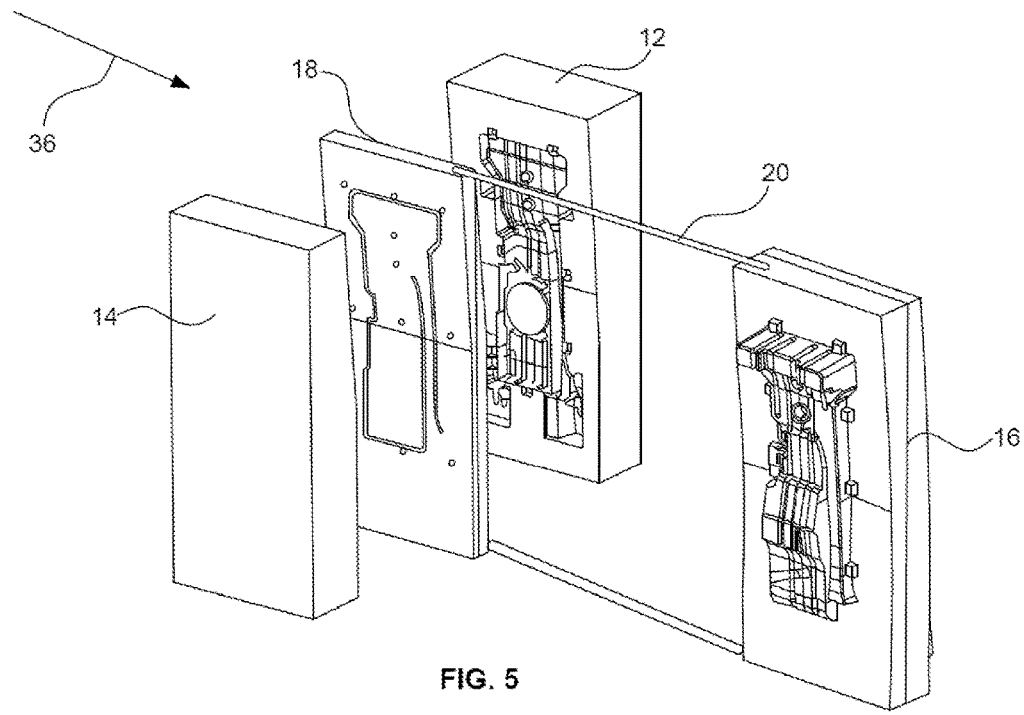
FIG. 5 shows the mold of FIG. 1 with the heating element located between the two exterior mold portions.

With reference to FIG. 5, the heating element 18 is now inserted into the mold between the mold portions 12 and 14 via a robot arm which grips rods 20 and moves the heating element in the direction of an arrow 36. This has the effect of simultaneously removing the interior mold portion 16 out from being in between the mold portions 12 and 14.

Figure 6:
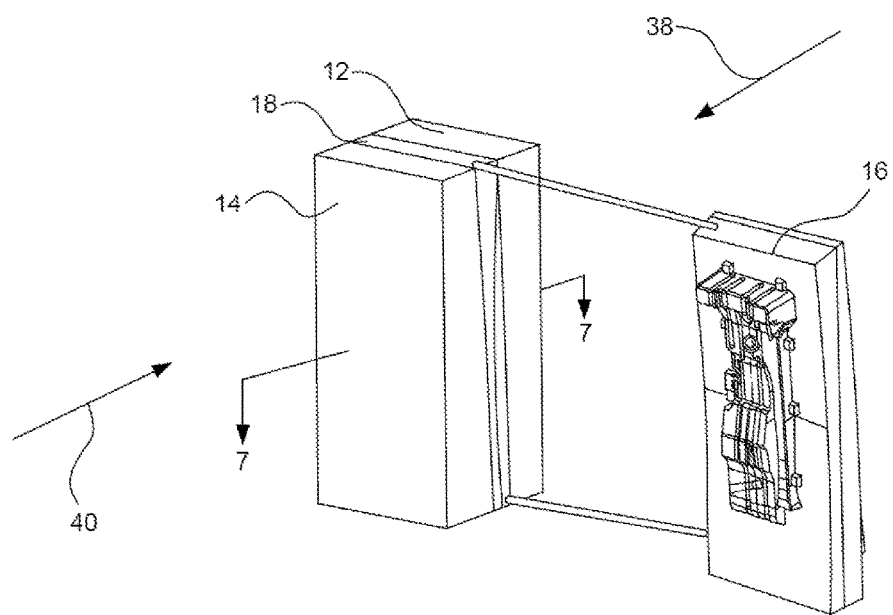
FIG. 6 shows the mold of FIG. 5 with the heating element sandwiched between the two exterior mold portions.
Figure 7:
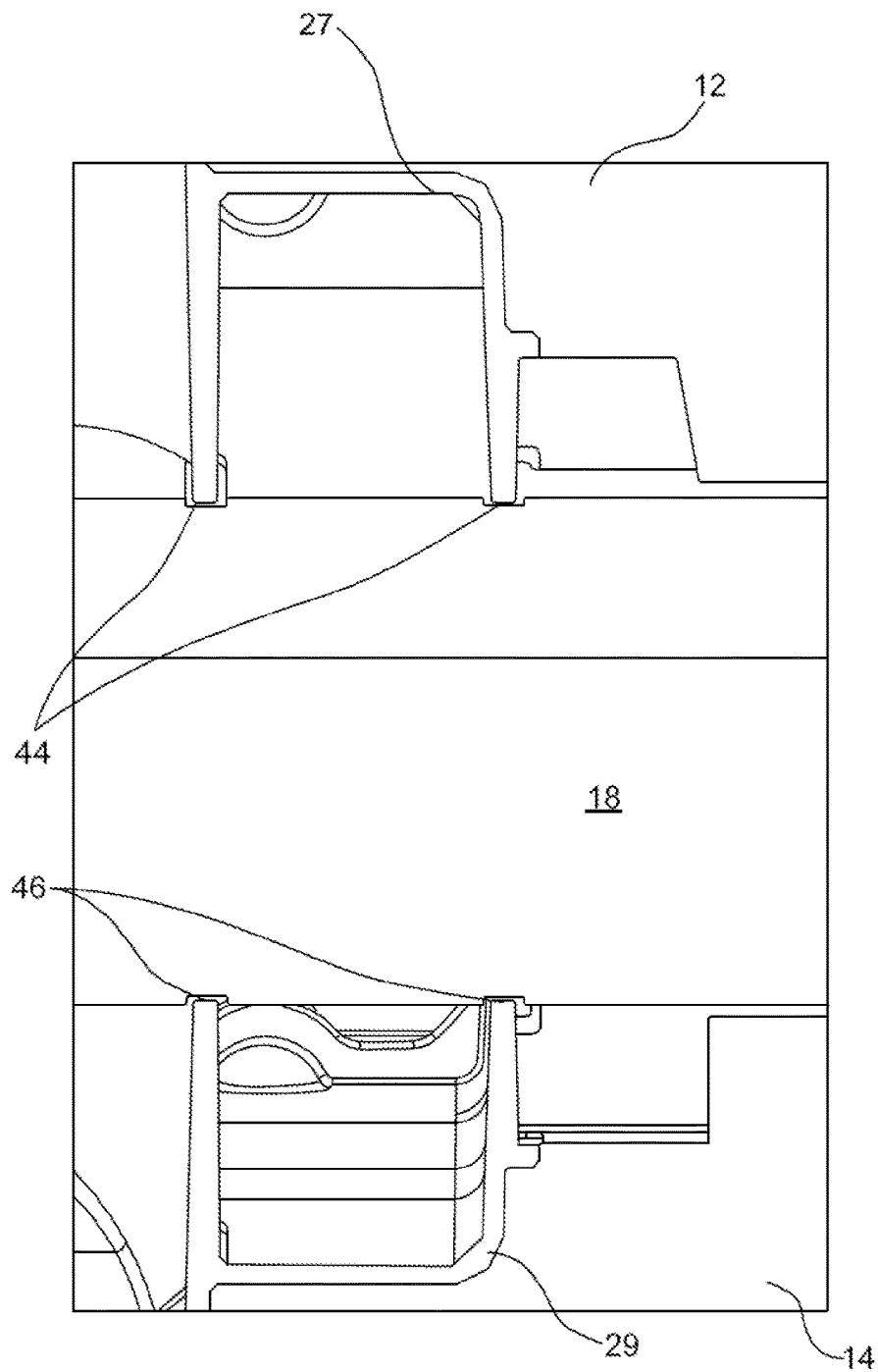
FIG. 7 is a partial sectional view of FIG. 6 taken along lines 7-7.

Turning to FIGS. 6 and 7, the mold portions 12 and 14 are moved towards each other in the respective directions of arrows 38 and 40 until they come into contact with the heating element 18. The heating element gap is set by injection press controls. The heating element 18 heats respective sections 44 and 46 of each of the first and second parts 27 and 29 to above their glass transition temperatures. In this example, resistive heat sources (not shown) in heating element 18 provide the heat for this step via radiant and/or contact heating. Other types of heat sources may be used. Although both sections 44 and 46 are heated in this example, in other examples only one of the two sections 44 and 46 may need to be heated, depending on the materials used.

Figure 8:
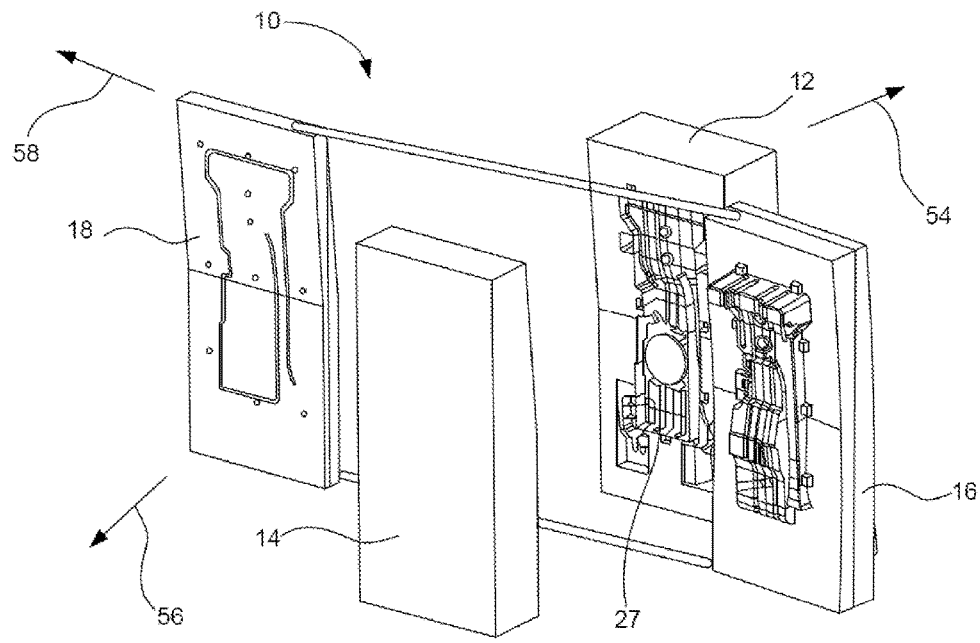
FIG. 8 shows the mold of FIG. 6 with the two exterior mold portions moved away from each other and the heating element removed therefrom.

Referring to FIG. 8, the exterior mold portions 12 and 14 are now moved away from each other in respective directions 54 and 56. The heating element 18 is removed from the mold 10 by moving the joined heating element 18 and interior mold portion 16 in the direction of an arrow 58.

Figure 9A:
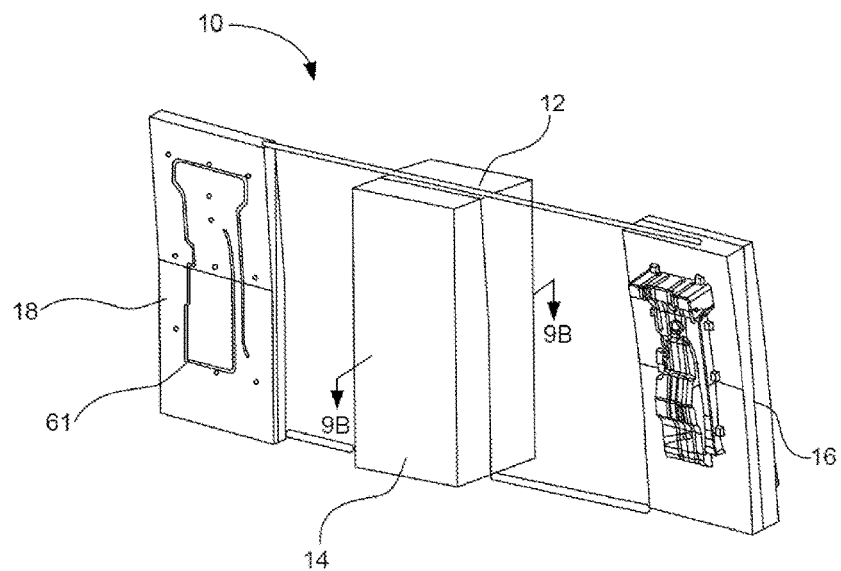
FIG. 9A shows the mold of FIG. 8 with the two exterior mold portions moved together to fuse the parts together.
Figure 9B:
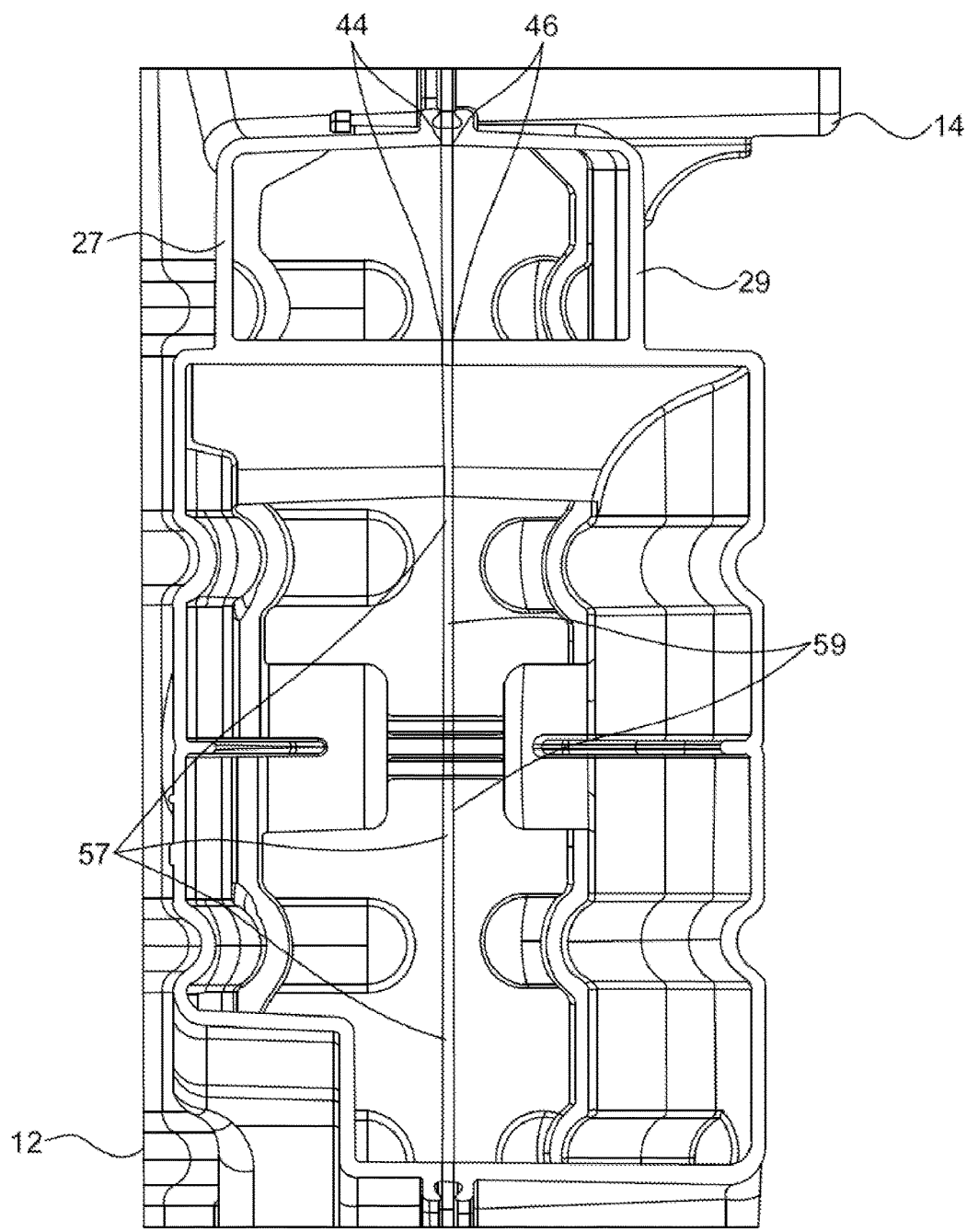
FIG. 9B is a partial sectional view of FIG. 3A taken along lines 9B-9B.

Turning to FIGS. 9A and 9B, the mold 10 is now closed by moving the exterior mold portions 12 and 14 towards each other. This causes the sections 44 and 46 of the first and second parts 27 and 29 of the item to come into contact with each other. The sections 44 and 46 of the first and second parts 27 and 29 of the item are cooled below their glass transition temperatures. This effectively welds the two parts 27 and 29 together. Note that sections 44 and 46 are part of respective weld ribs 57 and 59 that are heated by the heating element 18 and then welded together. The heating element 18 has a portion 61 in the shape of the rib 59 that heats the rib. The heating element 18 has a similar portion on the opposite side that heats the rib 57.

The residual temperature of the molded parts 27 and 29 from the injection molding operation is approximately ½ the temperature required to reach the state where thermoplastic resins begin to soften and can be welded. As such, the residual heat from the injection molding process reduces the amount of heat energy and cycle time needed to weld the parts 27 and 29 together. This is a benefit as the sections 44 and 46 do not need to be heated all the way up from room temperature to weld them together as would occur in a conventional process.

Figure 10:
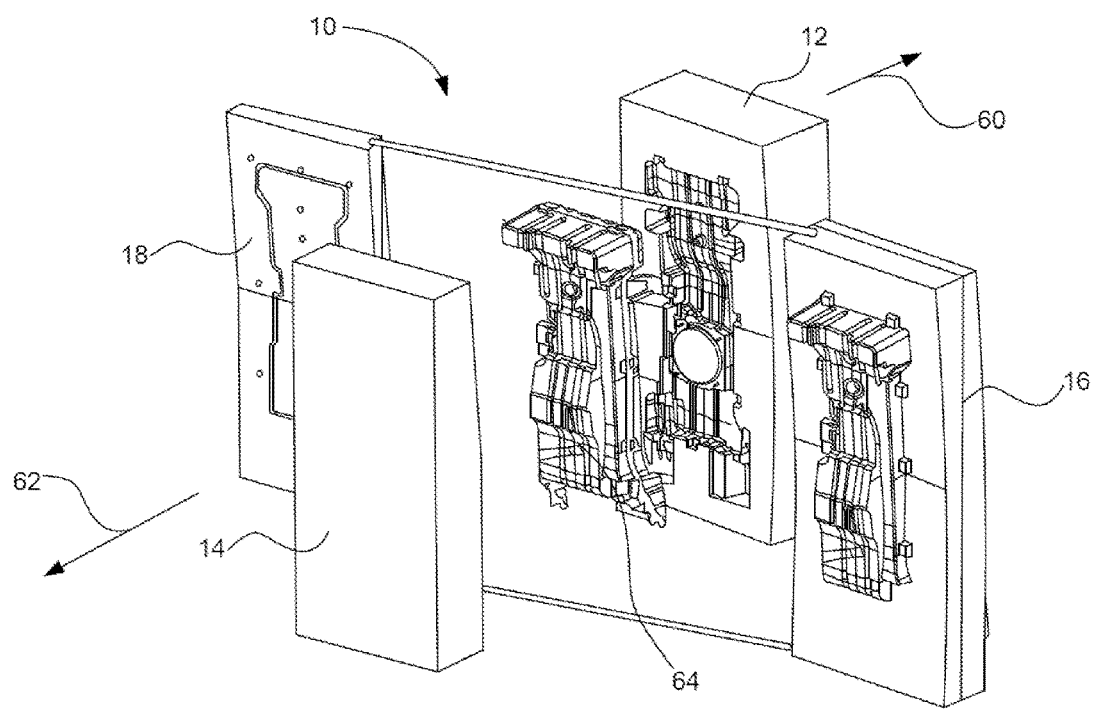
FIG. 10 shows the mold of FIG. 9A with the two exterior mold portions moved away from each other and the created item exposed.

As shown in FIG. 10, the mold 10 is now opened by moving the exterior mold portions 12 and 14 away from each other in respective directions 60 and 62. This allows the item 64, made up of parts 27 and 29, to be removed from the mold 10.

The above disclosure reduces the overall cycle time for the individual molding of two parts individually along with welding the two parts together. The time to transport molded parts from a molding press to a separate weld station as would occur in a conventional process is eliminated.

A number of implementations have been described. Nevertheless, it will be understood that additional modifications may be made without departing from the scope of the inventive concepts described herein, and, accordingly, other embodiments are within the scope of the following claims.

What is claimed is:

1. A method of creating an item, comprising:
providing a mold having first and second exterior portions and an interior portion;
introducing a first material between the first exterior portion and the interior portion of the mold to create a first part of the item;
introducing a second material between the second exterior portion and the interior portion of the mold to create a second part of the item;
allowing the first and second parts of the item to solidify;
opening the mold;
inserting a heating element into the mold;
heating a section of each of the first and second parts of the item to above their glass transition temperatures with the heating element;
removing the heating element from the mold;
closing the mold such that the sections of the first and second parts of the item come into contact with each other;
cooling the sections of the first and second parts of the item below their glass transition temperatures to become joined; and
opening the mold such that the item can be removed from the mold,
wherein the interior portion is coupled to the heating element.

2. The method of claim 1, wherein the interior mold portion is removed from being between the first and second exterior portions of the mold to allow the inserting step to take place.

3. The method of claim 1, wherein the interior mold portion is removed from being between the first and second exterior portions of the mold prior to the closing step such that the first and second exterior portions of the mold can move closer together to allow the sections of the first and second parts of the item to come into contact with each other.

4. The method of claim 1, wherein the first and second materials are substantially the same material.

5. The method of claim 1, wherein the first and second materials are different from each other.

6. The method of claim 1, wherein the first and second materials are plastic.

7. The method of claim 1, wherein the introducing steps are accomplished via an injection molding process.

8. The method of claim 1, wherein the heating step is accomplished by one or more of radiant heating and contact heating.

9. An item made by the method of claim 1.

10. The item of claim 9, wherein the first and second materials are substantially the same material.

11. The item of claim 9, wherein the first and second materials are different from each other.

12. The item of claim 9, wherein the first and second materials are plastic.

13. The item of claim 9, wherein the item is made via a process that includes injection molding.

14. A mold comprising:
an interior mold portion including features along a first surface for forming a portion of a first part of an item, and features along an opposite, second surface for forming a portion of a second part of the item;
a first exterior mold portion including a first cavity that cooperates with the first surface of the interior mold portion to form the first part of the item; and
a second exterior mold portion including a second cavity that cooperates with the second surface of the interior mold portion to form the second part of the item; and
a heating element spaced apart from the inner mold portion and coupled thereto,
wherein the interior mold portion and the heating element are configured to be displaceable, relative to the first and second exterior mold portions, between at least three position including:
a first position in which the interior mold portion is disposed directly between the first and second exterior mold portion;
a second position in which the heating element is disposed directly between the first and second exterior mold portions; and
a third position in which neither the interior mold portion nor the heating element is disposed directly between the first and second exterior mold portions.

* * * * *